(No Model.)
I. A. F. BANG & M. C. A. RUFFIN.
PROCESS OF PURIFYING ALCOHOL.
No. 314,910. Patented Mar. 31, 1885.
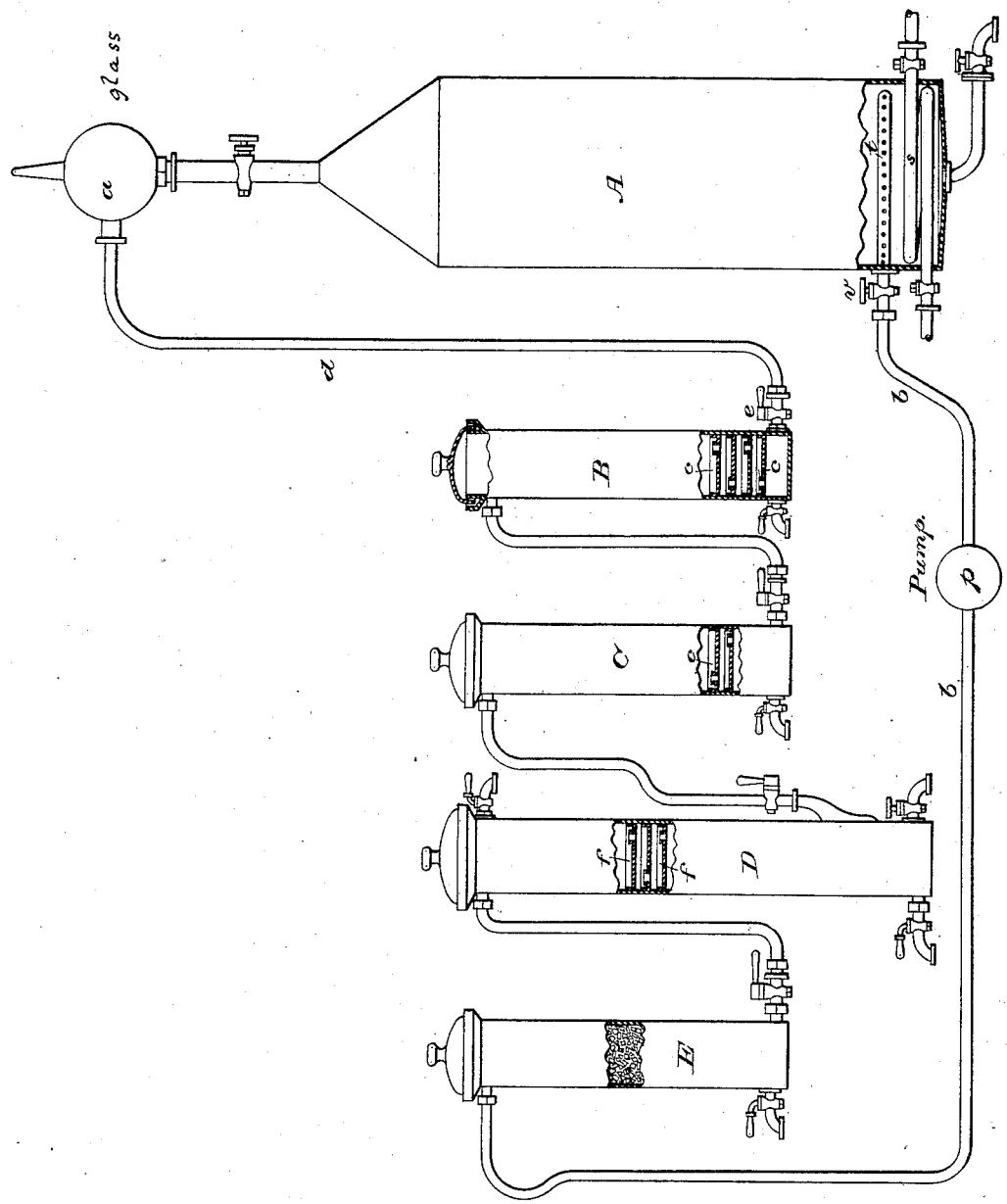
WITNESSES:
Geo. H. Fraser.
C. K. Fraser.
INVENTORS:
Ivar A. F. Bang and
M. C. Alfred Ruffin.
By their Attorneys,

UNITED STATES PATENT OFFICE.

IVAR AXEL FERDINAND BANG AND MARIE CHARLES ALFRED RUFFIN, OF PARIS, FRANCE.

PROCESS OF PURIFYING ALCOHOL.

SPECIFICATION forming part of Letters Patent No. 314,910, dated March 31, 1885.

Application filed January 13, 1885. (No model.) Patented in France August 17, 1883, No. 157,095.

*To all whom it may concern:*

Be it known that we, IVAR AXEL FERDINAND BANG, a subject of the King of Denmark, and MARIE CHARLES ALFRED RUFFIN, a citizen of the French Republic, both residing in Paris, France, have invented certain new and useful Improvements in Processes of Purifying Alcohols, of which the following is a specification.

Our invention has for its object a new process and apparatus for the purification of crude alcohols, irrespective of their origin or degree of concentration, in order to obtain at one distillation all the ethylic alcohol, together with the absolute elimination of the foreign products, commonly called in France "*goût de queue*" and "*goût de tête.*"

In fermenting sugary or saccharine substances we obtain a mixture of alcohol, organic substances, and water, which we distill in order to obtain more or less concentrated alcoholic solutions, which may be transported at little expense. This product is called in France "*flegmes*" of alcohol, and usually contains about fifty per cent. of water, being the same as "proof-spirits."

By the fermentation of the substances before mentioned we obtain on the one hand ethylic alcohol or alcohol proper, and on the other hand numerous secondary products, of which the nature varies according to the fermentable substance employed and the manner in which the fermentation is conducted. Among these products are invariably found some superior homologous alcohols of the series $C_N H_{2N+2}O$, as well as their ethers, especially the butylic and amylic alcohols. We also find acetic aldehyde arising from the partial oxidation of the alcohol during the fermentation. These alcohols and their ethers are called in practice "essential oils," or in France "*goût de queue,*" and the aldehyde "*goût de tête.* In the description of our process we will adopt the terms "essential oils" and "aldehydes" to signify these products.

To obtain from the *flegmes* or proof-spirits a pure alcohol of good quality it has been necessary up to this time to employ very complex distilling apparatus and to operate by fractional distillation. The absolute separation of the essential oils and aldehyde could only be effected by the exercise of infinite pains, and the process was very tedious. Despite all this care we find in the larger portion of the alcohol of commerce considerable quantities of these foreign matters, which are true poisons.

Our process has for its object to obtain the whole of the ethylic alcohol in a state of absolute purity by the previous separation of the essential oils and aldehyde in such a manner that we may afterward at one simple distillation eliminate the water contained in the *flegmes* in order to obtain pure alcohol.

Our process is based on the solubility of the essential oils and aldehyde contained in the *flegmes* or proof spirits in certain special solvents. Thus by agitating the crude alcohol or *flegmes* in a hydrocarbon, for example, the following occurs: The hydrocarbon, not being soluble in alcohol at proof, (fifty per cent.,) exercises a solvent action on the essential oils, these products being relatively very sparingly soluble in the dilute alcohol, but capable of mixing in all proportions with the hydrocarbon. The aldehyde, while being soluble in all proportions in the aqueous alcohol, is also dissolved by the hydrocarbon, but only by repeated contact. We find, then, that after agitation and repose, the hydrocarbon rises to the surface of the dilute alcohol and contains nearly the whole of the essential oils and a part of the aldehyde, which was at first dissolved in the alcohol.

If, in place of operating on the *flegmes*, we wish only to purify alcohols already rectified, but containing still some deleterious foreign elements, it will be necessary to dilute these alcohols, in order to so reduce them that they will not dissolve the hydrocarbon used in the purification.

We employ as solvents the liquid hydrocarbons, and we prefer the volatile products of petroleum, commonly called "naphtha," or in France "*essence de pétrole.*" These products are purified and rendered inodorous by means of repeated washings in sulphuric acid at 66°, and finally in fuming or anhydrous acid.

In carrying out our process we can, as we have already said, proceed by successive washings followed by decantations. To this effect, the *flegmes* being turned into a large vessel hermetically closed, a certain quantity of the hydrocarbon is introduced, and by suitable mechanical means the contents of the vessel are violently agitated. They are then allowed to rest until the hydrocarbon, saturated with the oils, floats upon the top, when it is decanted. This operation is repeated with fresh hydrocarbon until the hydrocarbon employed gives off no odor in evaporating. The hydrocarbon is recovered by washing it in sulphuric acid. The above mode of operation, however, is not very practicable where the process is carried on on a large scale, and we much prefer to employ that mode of operation and the apparatus which we will now describe in connection with the accompanying drawing.

In the drawing our improved apparatus is shown in elevation, partly broken away in section.

A is a reservoir, preferably cylindrical and of sheet-iron, to receive the *flegmes*. The upper part is fitted with a glass globe or sphere, $a$, or a sheet-iron box lined or faced with glass. The lower part of this reservoir is provided with a coil of pipe, $s$, by passing water or steam through which the temperature in the reservoir may be regulated, and with a perforated pipe, $t$. This pipe $t$ is the end of a pipe, $b$, which leads from a pump, $p$, to the reservoir, being provided with a valve or cock, $v$.

B is a vessel, also cylindrical, by preference, and provided interiorly with shelves or trays $c$. This reservoir is designed to receive pure water, and it is connected by a pipe, $d$, and cock $e$ with the upper part of reservoir A.

C is a vessel similar to B, with which it communicates. This vessel is filled with anhydrous calcium chloride or with a solution thereof, placed on its shelves or trays $c\ c$.

D is a cylinder of lead, provided with leaden shelves or trays $f$. This cylinder or vessel is destined to receive sulphuric acid at 66°.

E is a vessel in which is placed marble-dust or any other carbonate of a similar character.

The operation is as follows: The reservoir A is filled with *flegmes* to be purified. The upper part formed by the glass globe alone remains unfilled. The four other vessels are filled with the several substances indicated hereinbefore. The pump $p$, which is put in communication by the cock $v$ with the lower part of the reservoir A, is set in motion and forces the hydrocarbon through the pipe $b$ into the said reservoir, which it enters through the perforations in the tube or nozzle $t$. The hydrocarbon disperses rapidly throughout the mass of the *flegmes*, and in its passage becomes charged with the infecting principles contained in the alcoholic liquid and passes up into the glass globe. Overflowing from this globe, the hydrocarbon flows off through the connecting-pipe $d$ to the vessel B, filled with water, as before explained. Entering this vessel at the bottom, the hydrocarbon passes back and forth upward through the water contained therein, and in so doing gives up all traces of alcohol that it may have carried over. Passing out at the upper part of vessel B, it enters vessel C at the bottom, passing up through the calcium chloride therein. This removes from it all the water and renders it absolutely anhydrous. From thence the hydrocarbon passes into the vessel D at the bottom, and encounters, in rising, the sulphuric acid held in the trays, and the action of the acid serves, by repeated contact, to absorb the essential oils and aldehyde, forming conjugale sulpho-acids. The hydrocarbon is thus completely regenerated, as it is freed from all odorous substances with which it was charged by its passage through the *flegmes*. When the hydrocarbon passes out from the vessel containing acid, it enters the vessel E, supplied with marble-dust or other similar neutralizing agent. This removes any traces of acid that may have been carried over by the hydrocarbon. The hydrocarbon passes from the vessel E completely purified, and is again drawn in by the pump and forced into the reservoir A. The current once established is only arrested when it is judged that the *flegmes* has been sufficiently purified. It is only necessary then to allow the purified *flegmes* to rest for a few hours to effect the complete separation of the hydrocarbon. The *flegmes* thus purified consists only of water and alcohol, and the former is removed or reduced by the usual process of distilling or rectification.

To increase the insolubility of the essential oils and their ethers in the *flegmes*, and also to obtain a more rapid separation through the medium of the hydrocarbon, it is sometimes advantageous to put into the *flegmes* a quantity of some cheap salt which will dissolve in it readily—as, for example, sodium chloride.

In explaining our process we have supposed the *flegmes* to have a strength of fifty per cent. of absolute alcohol or proof. This, however, is not necessary to the practical working of our process, which is applicable to all *flegmes* above or below fifty per cent. of absolute alcohol or proof, as well as to all alcohols of whatever nature or from whatever source they are produced.

We are aware that a method of purifying crude alcohol has been patented which consists in placing the alcohol, with paraffine, in a strong closed vessel and heating to 140° Fahrenheit, and agitating for about three hours, then adding hot water, agitating again, cooling to solidify the paraffine, and finally separating the solidified paraffine by filtration. We are also aware of another method, which consists in vaporizing the alcohol and passing its vapors through melted paraffine. These methods resemble that constituting our invention in only one respect—namely, the employment of a hydrocarbon as the agent for dissolving or absorbing the impurities. Our process is characterized by the employment of a solvent which is liquid at an ordinary or normal temperature, and by the treatment of the alcohol at a normal or comparatively low temperature and without the necessity of heating the alcohol.

We claim as our invention—

1. The herein-described method of purifying crude alcohol to remove from it the essential oils and aldehydes, which consists in passing a liquid solvent of these impurities continuously through the liquid alcohol at a normal temperature, substantially as described, whereby pure aqueous alcohol is obtained.

2. The herein-described method of purifying crude alcohol to remove from it the essential oils and aldehydes, which consists in mixing with the liquid alcohol at a normal temperature a liquid hydrocarbon, which dissolves the essential oils and aldehydes, and subsequently separating the hydrocarbon from the alcohol, substantially as set forth.

3. The herein-described process of treating crude alcohol to separate from it the essential oils and aldehydes, which consists in placing the alcohol in a suitable vessel, introducing a liquid hydrocarbon into the bottom of the vessel in order that it may ascend through the alcohol and dissolve the essential oils and aldehydes, taking the hydrocarbon from the top of the vessel, conducting it to the bottom of a vessel containing water, and causing it to ascend through the body of water, whereby the hydrocarbon holding the essential oils and aldehydes in solution is delivered free from admixture of alcohol, substantially as set forth.

4. The improved process of treating crude alcohol for the separation of the essential oils and aldehydes, which consists in placing the alcohol in a suitable vessel, passing a liquid hydrocarbon up through the mass of alcohol, taking the hydrocarbon from the top thereof, conducting it to the bottom of a vessel containing water, causing it to ascend through the water, and conducting it thence to a vessel containing calcium chloride or equivalent dehydrating agent, and passing it through said vessel, whereby the hydrocarbon holding the essential oils or aldehydes in solution is delivered without admixture of alcohol and free from moisture, substantially as set forth.

5. The improved process of separating essential oils and aldehydes from crude alcohol, which consists in passing a liquid hydrocarbon up through the mass of alcohol, thereby dissolving the essential oils and aldehydes, passing the hydrocarbon then through water to free it from alcohol, passing it then through a vessel containing some dehydrating substance to free it from water, and finally passing it through sulphuric acid, whereby the essential oils or aldehydes are taken up by the acid, leaving the hydrocarbon regenerated, substantially as set forth.

6. The improved process of separating essential oils and aldehydes from crude alcohol, which consists in adding to the alcohol a soluble salt, then adding a liquid hydrocarbon, and finally separating the hydrocarbon, substantially as set forth.

In witness whereof we have hereunto signed our names in the presence of two subscribing witnesses.

IVAR AXEL FERDINAND BANG.
MARIE CHARLES ALFRED RUFFIN.

Witnesses:
ROBT. M. HOOPER,
GEORGES CHAPUIS.